L. A. ASPINWALL.
Potato-Planter.

No. 36,634. Patented Oct. 14, 1862.

WITNESSES;

INVENTOR;
Lewis A. Aspinwall

UNITED STATES PATENT OFFICE.

LEWIS A. ASPINWALL, OF IRELAND'S CORNERS, NEW YORK.

IMPROVEMENT IN MACHINES FOR PLANTING POTATOES.

Specification forming part of Letters Patent No. 36,634, dated October 14, 1862.

*To all whom it may concern:*

Be it known that I, LEWIS A. ASPINWALL, of Ireland's Corners, Albany county, State of New York, have invented a new and useful Improvement in Machines for Planting Potatoes; and I declare the following specification, with the drawings hereto appended as part thereof, to be a full and accurate description of my invention.

Figure 3:
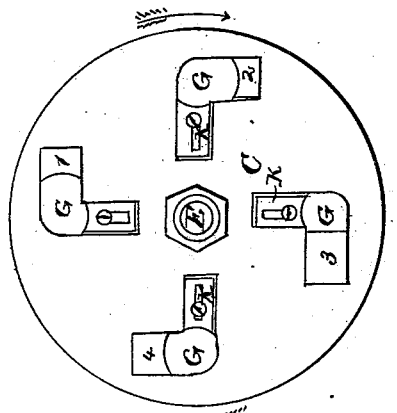
Figure 4:
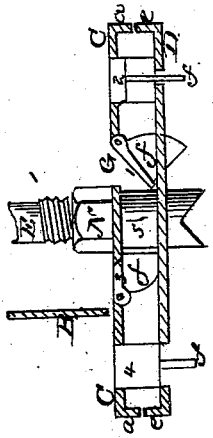
Figure 5:
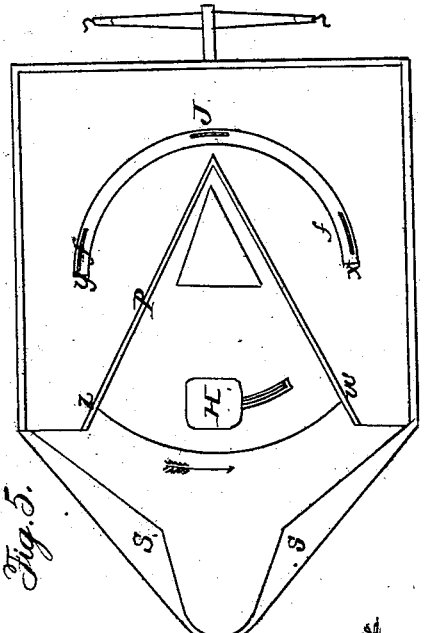
Figure 1:
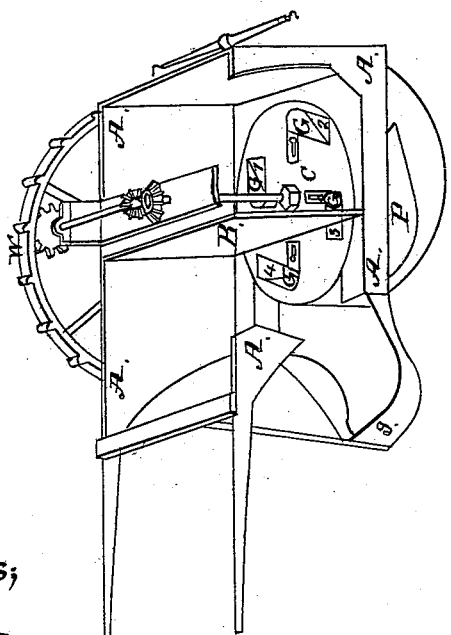
Figure 2:
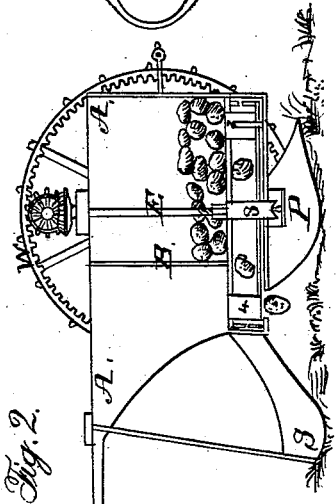

Figure 1 represents in perspective the machine, with the right side and wheel removed to show the interior apparatus. Fig. 2 represents the machine in middle section through its length. Fig. 3 represents in plan the revolving cylinder; Fig. 4, the same in profile section. Fig. 5 represents the base of the machine in plan, the machine being reversed.

Similar letters in the different figures denote the same parts of the machine.

The machine consists of a box, A A, the sides and bottom projecting back beyond its rear wall, B. Its top is open, and it has a double bottom, the upper one being perforated to receive a revolving hollow cylinder, C, filling it from side to side and from the front wall back beyond the rear wall, B, the top of the cylinder forming the principal part of the floor of the box.

The machine is hung upon wheels W, fixed to the sides of the box. It has a plow, P, attached to its bottom to open a furrow for the potatoes, and a scraper, S, fastened in its rear to draw the earth over the potatoes dropped in the furrow.

The hollow cylinder C is made to revolve by gearing connecting its shaft with cog-wheels attached to or forming part of one of the wheels, as shown in the drawings.

The principal feature of my invention is the hollow cylinder C, which is thus constructed: C is an upper plate; D, a lower one. Each plate has a rim—that of the upper plate, *a*, projecting downward; of the lower plate, *e*, upward—so fitted that when they touch each other the space between the plates can freely hold the smallest-sized seed potatoes. To enable it to hold the larger sizes, the plates can be separated sufficiently by the nut-and-screw arrangement upon the shaft E. This shaft is fixed to the lower plate. Its lower portion between the plates is larger than the upper part, and is turned down into a shoulder, upon which the upper plate rests when in its nearest position to the lower one, and is there held by a nut, N, working upon a screw-thread cut upon the shaft. When it is desired to increase the space between the plates the screw is turned back, the plate slipped upward, and collars put in between the shoulder and the plate, and the screw set down upon them. The upper plate is perforated by openings G of the proper width to pass the seed potatoes, which are put into the box, (see Fig. 2,) and these openings extend laterally a distance sufficient to have fitted within them hinged trap-doors 1 2 3 4, their hinges being in their front edges, (in reference to their movement, which is in the direction of the arrows.) These doors are opened and shut by means of fins *f* projecting from their bottoms, which fins, when the trap is down, pass through slots in the bottom plate of the revolving cylinder and through a slot, J, Fig. 5, in the bottom of the machine. While these fins *f* traverse the solid parts of the bottom of the machine they hold the traps shut within the upper plate of the cylinder. At other times the traps fall open—that is, the traps are closed while they are passing from *y* to *z* and from *w* to *x*. At other times they are open. In the bottom plate of the cylinder C, at the foot of each trap, there is an opening, H, (shown in Fig. 5,) large enough to pass a potato, so that as each opening moves over a space left vacant in the bottom of the machine between the mold-boards of the plow from *v* to *w* a potato can drop into the furrow opened by the plow.

It will be seen that the potatoes in the box A A drop through the openings G into the cylinder C. Now, if the traps 1 2 3 4 were fixed inclines, it would constantly occur that while one or more potatoes might be lying at their feet between the plates one or more would be lying only partially down in the openings and partly above the upper plate. Consequently when one of them reached the back plate, B, it would be crushed between the plate and the edge of the slot. This would occur at each opening, and a large number be thus broken and rendered useless, and the clogging of the openings with their fragments prevent the operation of the machine. If there were only openings without traps, the result would be the same. One potato would be lying upon the bottom plate and another partly down upon it, partly above the upper plate of the cylinder; but by the closing of the openings by the traps successively before the potatoes reach B they roll over a level floor and cannot be injured.

In order to regulate the size of the openings G for different-sized potatoes, there is a gage, K, being a sliding plate lying within a countersunk recess in the upper plate, having a slot and set-screw, by means of which it can be closed over the orifice G as far as required to diminish its size, the gage being so arranged, as shown, as to position in reference to the trap-door as not to interfere with its operation.

What I claim as my invention, and desire to secure by Letters Patent, is—

1. The box or magazine to contain the seed potatoes, having a hollow cylindrical revolving bottom with openings in its upper and lower plates for the passage of the potatoes down into the ground, the openings in the upper plate being provided with a gage to regulate their size, also with trap-doors operating automatically to protect the potatoes from injury and regulate their passage through the hollow bottom, substantially as described in this specification.

2. The combination of the box or magazine so constructed and fitted, as described, with the gearing for revolving the bottom, and with the plow and scraper, substantially as set forth in this specification.

LEWIS A. ASPINWALL.

Witnesses:
RICHD. VARICK DE WITT,
A. G. ROSE.